Feb. 3, 1942.   C. H. SPAULDING   2,272,026
SEPARATING IMPURITIES FROM WATER
Filed Oct. 10, 1938
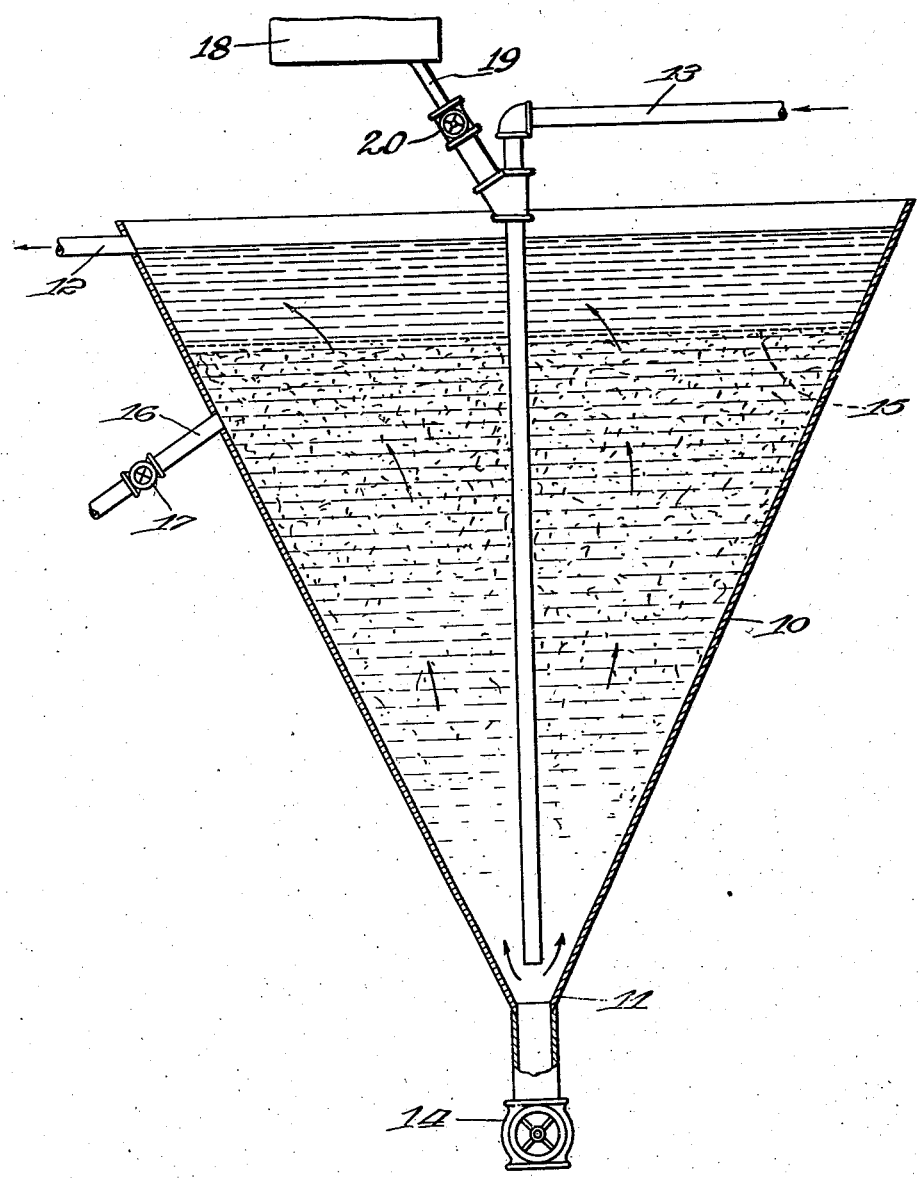
Inventor:
Charles H. Spaulding.
By Chritton, Wiles, Davies, Hirsch & Dawson
Attys.

Patented Feb. 3, 1942

2,272,026

UNITED STATES PATENT OFFICE 2,272,026

SEPARATING IMPURITIES FROM WATER

Charles H. Spaulding, Springfield, Ill.

Application October 10, 1938, Serial No. 234,272

2 Claims. (Cl. 210—58)

This invention relates to a method of separating impurities from water, and more particularly to the purification of municipal and other water supplies. It is an improvement upon my devices shown in Patents No. 2,021,672, issued November 19, 1935, and No. 2,127,314, issued August 16, 1938.

In Patent 2,021,672, I describe a method by which purification of water is accomplished by means of a velocity-sustained area of small particles maintained as a layer in the water to be purified. The maintenance of such a velocity-sustained area is accomplished by rapidly diminishing the velocity of the water while flowing in an upward direction. As shown in that patent, the impurities were collected in this area and remained there until they had grown by accretion to such a size that they would no longer be sustained by the velocity of the water. They would then drop to a lower level and ultimately would drop out the bottom of the precipitation zone from which they were removed by mechanical means.

It has now been discovered that this process may be advantageously altered, particularly where it is desired to accomplish similar results at a lesser cost by withdrawing precipitated matter from the precipitating zone preferably after it has reached a substantially increased size. In this method, the reaction zone of the previous apparatus may be dispensed with, and the mechanical precipitate-removing opening in the bottom of the device may likewise be omitted. The precipitate may be introduced directly to the zone of diminishing velocity and the water removed directly therefrom for use.

The device is illustrated in the drawing, in which the figure illustrates a conical tank 10 having its apex 11 at the bottom and provided with an overflow pipe 12 and inflow line 13, which leads to apex of the cone and there discharges. A full opening valve 14 may be provided at the bottom of the cone, if desired, to remove any large concretions which may develop from time to time, or these may be removed by suction, if desired. The velocity of water at the apex of the cone is sufficient to support even large impurities, but the velocity is adjusted to the size of the cone so that somewhere below the top of the cone the velocity is diminished to a point where the water will not support the coagulated impurities, or even the finest impurities if it is desired to remove them without coagulation. At this point, a blanket of velocity-supported impurities will collect in time. The top of this blanket is indicated by the dotted line 15. From that point downward, the size of the particles gradually increases, as well as their concentration, until a zone is reached where the upward velocity is so high as to permit little or no concentration of impurities. The result is a relatively narrow blanket of velocity-sustained impurities. A draw-off line 16, controlled by valve 17, is provided at a point below the top of the blanket, and of relatively small size. This draw-off line may be operated continuously or periodically to remove the sludge which has accumulated in the blanket. Inasmuch as the precipitated matter has vastly concentrated itself at this point, large quantities of it may be removed with very little water. By operating in this manner, pure clean water may be continuously taken from the overflow and the precipitated matter continuously or periodically withdrawn from the draw-off line.

The water entering the cone through the line 13 may or may not have been previously treated with a precipitating chemical. Where such precipitate is desired, it may be introduced just before the water reaches the cone or in the cone, or may have been introduced some time previously, if such action is desired.

If desired, the precipitating agent may be introduced into the water inlet pipe 13. As shown in the drawing, the precipitating agent may thus be delivered from the storage box 18 through the pipe 19 to the inlet pipe 13, the passage thereof through the pipe 19 being controlled by the valve 20.

The foregoing detailed description has been given for clearness of understanding only, and no unnecessary limitations should be understood therefrom, but the appended claims should be construed as broadly as permissible in view of the prior art.

I claim:

1. The method of purifying a supply of water laden with the impurities characteristic thereof, which comprises maintaining a zone of upwardly increasing area, mixing the impurity laden water with a precipitating agent, introducing a mixture into the lower portion of said zone at a velocity sufficient to support substantially all of the impurities and precipitate therein, passing said mixture upwardly through said zone wherein fine impurities and precipitate aggregate, simultaneously progressively diminishing the velocity of said mixture, said velocity at an intermediate portion of said zone below the top thereof being insufficient to support said impurities and precipitate, whereby a velocity-supported blanket of impurities and precipitate is created immediately below said intermediate portion of said zone and an area containing clear water moving at low velocity is provided above said intermediate portion, withdrawing water highly concentrated with aggregated impurities and precipitate from the area of said blanket as a divergent side stream, and withdrawing clear liquid from said low velocity area.

2. The method as set forth in claim 1, in which the precipitating agent is added to the water immediately prior to the entrance thereof into the precipitating zone.

CHARLES H. SPAULDING.